(12) United States Patent
Brösamle et al.

(10) Patent No.: US 10,833,554 B2
(45) Date of Patent: Nov. 10, 2020

(54) CIRCULATION PUMP ASSEMBLY

(71) Applicant: GRUNDFOS HOLDING A/S, Bjerringbro (DK)

(72) Inventors: Pino Brösamle, Asperg (DE); Georg Blaser, Asperg (DE)

(73) Assignee: GRUNDFOS HOLDING A/S, Bjerringbro (DK)

( * ) Notice: Subject to any disclaimer, the term of this patent is extended or adjusted under 35 U.S.C. 154(b) by 173 days.

(21) Appl. No.: 15/581,096

(22) Filed: Apr. 28, 2017

(65) Prior Publication Data

US 2017/0324298 A1 Nov. 9, 2017

(30) Foreign Application Priority Data

May 4, 2016 (EP) ..................................... 16168323

(51) Int. Cl.
*H02K 5/22* (2006.01)
*F04D 13/06* (2006.01)
(Continued)

(52) U.S. Cl.
CPC ............. *H02K 5/225* (2013.01); *F04D 13/06* (2013.01); *F04D 13/064* (2013.01); *F04D 13/0686* (2013.01); *F04D 13/0693* (2013.01); *F04D 29/026* (2013.01); *F04D 29/406* (2013.01); *F04D 29/628* (2013.01); *H02K 5/10* (2013.01); *H02K 5/1282* (2013.01); *H02K 11/33* (2016.01); *H02K 15/14* (2013.01); *F04D 29/18* (2013.01); *F05D 2230/21* (2013.01); *F05D 2230/23* (2013.01); *F05D 2300/43* (2013.01)

(58) Field of Classification Search
CPC ............... H02K 11/30–38; H02K 9/22; H02K 5/12–128; H02K 5/132; H02K 1/04; H02K 3/44; H02K 3/32–40; H02K 3/30
See application file for complete search history.

(56) References Cited

U.S. PATENT DOCUMENTS 2,689,529 A * 9/1954 Wightman .............. F04D 1/063
417/423.3
2,883,566 A * 4/1959 Briggs ................. H02K 5/1285
310/87
(Continued)

FOREIGN PATENT DOCUMENTS

| JP | 2001 304166 A | 10/2001 |
|---|---|---|
| JP | 2004 183595 A | 7/2004 |
| WO | 2012/062638 A2 | 5/2012 |

*Primary Examiner* — Peter J Bertheaud
*Assistant Examiner* — Geoffrey S Lee
(74) *Attorney, Agent, or Firm* — McGlew and Tuttle, P.C.

(57) ABSTRACT

A circulation pump assembly, with a wet-running electrical drive motor (4), includes a pump casing (6) as well as a motor housing (22) which is connected to the pump casing (6). The motor housing (22) is a combined stator and electronics housing that accommodates a stator (18) of the drive motor (4) as well as motor electronics (34). The motor housing (22), at a first axial end (24) facing the pump casing (6), is closed by an air gap sleeve (16) of the drive motor. The motor housing (22), at a second axial end (26) which is away from the pump casing (6), includes an opening (42) closed by a cover (28). An interior of the motor housing (22), in a region adjacent the first axial end (24), is filled with a potting mass (40) surrounding the stator (18) and the motor electronics (34).

19 Claims, 1 Drawing Sheet

(51) Int. Cl.
    *H02K 5/128*    (2006.01)
    *F04D 29/02*    (2006.01)
    *H02K 11/33*    (2016.01)
    *H02K 5/10*     (2006.01)
    *H02K 15/14*    (2006.01)
    *F04D 29/62*    (2006.01)
    *F04D 29/40*    (2006.01)
    *F04D 29/18*    (2006.01)

(56) References Cited

U.S. PATENT DOCUMENTS

| | | | | |
|---|---|---|---|---|
| 3,041,976 | A * | 7/1962 | Maynard | H02K 5/128 417/357 |
| 3,135,885 | A * | 6/1964 | Maynard | H02K 5/132 310/87 |
| 3,210,577 | A * | 10/1965 | Hogue | H02K 5/132 310/43 |
| 3,555,319 | A * | 1/1971 | Schaefer | H02K 5/1285 310/87 |
| 4,387,313 | A * | 6/1983 | Yamamoto | H02K 17/30 310/71 |
| 4,451,750 | A * | 5/1984 | Heuer | H02K 5/225 310/71 |
| 4,456,844 | A * | 6/1984 | Yamamoto | H02K 11/26 310/43 |
| 4,492,889 | A * | 1/1985 | Fukushi | H02K 5/128 29/596 |
| 5,095,612 | A * | 3/1992 | McAvena | H02K 5/10 264/272.2 |
| 5,577,895 | A * | 11/1996 | Franklin | F16L 39/04 417/238 |
| 5,644,178 | A * | 7/1997 | Halm | H02K 3/50 310/43 |
| 5,889,343 | A * | 3/1999 | Bryant | H02K 5/225 174/653 |
| 6,538,350 | B2 * | 3/2003 | Martin | H02K 5/225 310/43 |
| 7,042,124 | B2 * | 5/2006 | Puterbaugh | H02K 5/10 310/43 |
| 8,633,623 | B2 * | 1/2014 | Bingler | H02K 11/33 310/87 |
| 8,729,756 | B2 * | 5/2014 | Eguchi | F04D 29/5806 310/86 |
| 2002/0047330 | A1 * | 4/2002 | Martin | H02K 5/24 310/43 |
| 2004/0108779 | A1 * | 6/2004 | Boettger | H02K 5/15 310/89 |
| 2005/0074548 | A1 * | 4/2005 | Puterbaugh | H02K 15/12 427/104 |
| 2007/0048157 | A1 * | 3/2007 | Collins | F04D 15/0218 417/423.3 |
| 2007/0069841 | A1 * | 3/2007 | Kusano | H02K 3/522 335/202 |
| 2007/0286723 | A1 * | 12/2007 | Ihle | F04D 29/5813 415/206 |
| 2009/0022610 | A1 * | 1/2009 | Materne | F04D 13/0626 417/423.7 |
| 2011/0296698 | A1 * | 12/2011 | Busse-Grawitz | G01D 11/30 33/1 PT |
| 2013/0028765 | A1 * | 1/2013 | Yokozawa | H02K 11/33 417/423.11 |
| 2013/0294949 | A1 * | 11/2013 | Blaser | H02K 1/2753 417/410.1 |

* cited by examiner

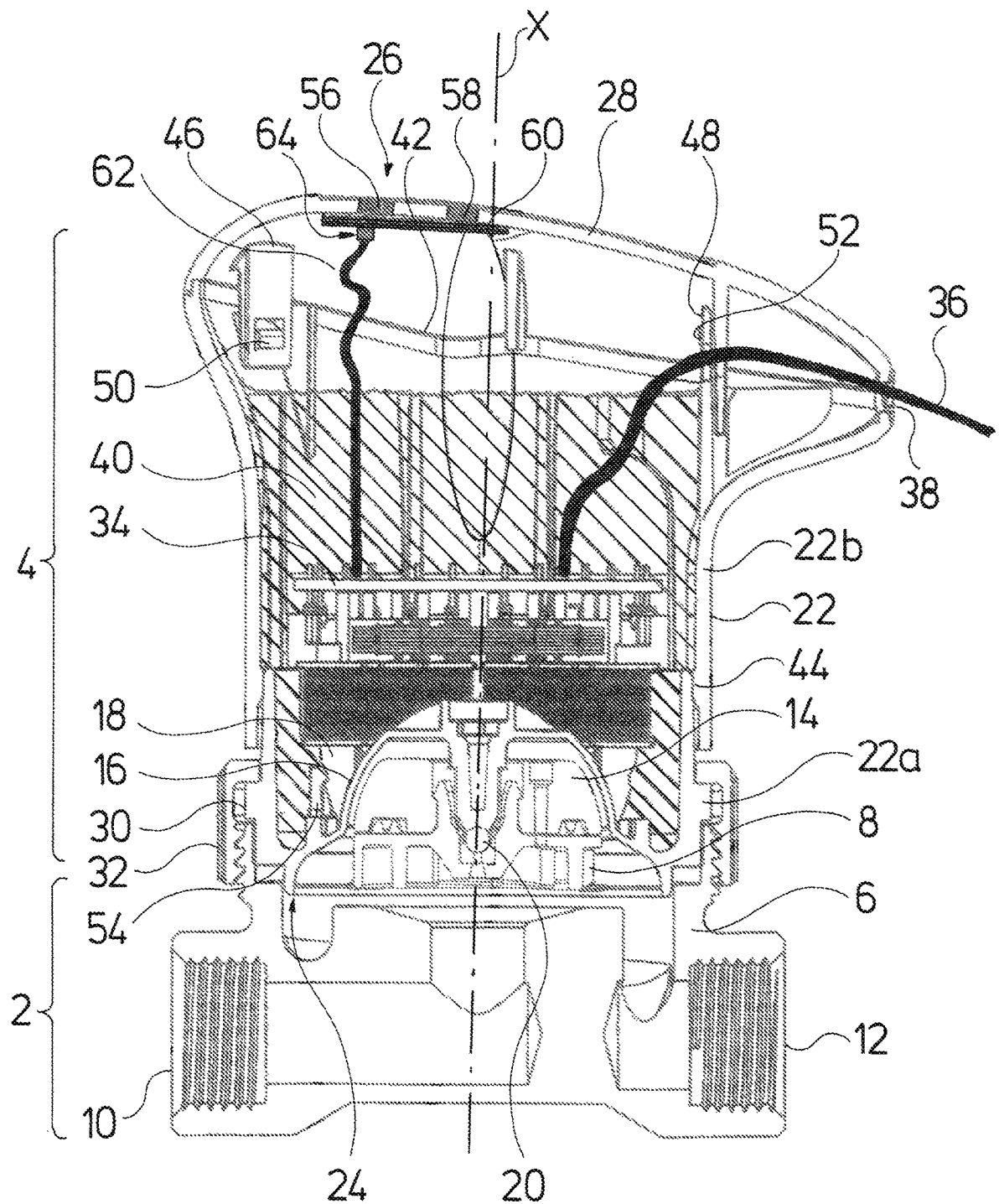

US 10,833,554 B2

CIRCULATION PUMP ASSEMBLY

CROSS REFERENCE TO RELATED APPLICATIONS

This application claims the benefit of priority under 35 U.S.C. § 119 of European Application 16 168 323.0 filed May 4, 2016, the entire contents of which are incorporated herein by reference.

FIELD OF THE INVENTION

The invention relates to a circulation pump assembly with a wet-running, electrical drive motor and which circulation pump assembly comprises a pump casing as well as a motor housing which is connected to the pump casing, wherein the motor housing, as a combined stator and electronics housing, accommodates a stator of the drive motor and motor electronics, and the invention relates to a method for manufacturing a circulation pump assembly.

BACKGROUND OF THE INVENTION

Circulation pump assemblies are known, in particular for heating installations or for service water circulation and these assemblies comprise a pump casing with an impeller rotating therein and with a drive motor connected directly to the pump casing. Moreover, motor electronics for activating the drive motor and which in particular can comprise a frequency converter, are yet present in modern circulation pump assemblies. The drive motors are mostly designed as wet-running motors, which is to say they comprise a can which is arranged between the rotor and the stator of the drive motor, so that the rotor rotates in the medium to be delivered. A special design of these circulation pumps concerns circulation pumps with a so-called spherical motor, with which a construction unit of the impeller and rotor is rotatably mounted on a central mounting (bearing) ball. With these motors, the can is designed as a spherical-cap-like air gap sleeve which extends concentrically around the mounting ball.

With such circulation pump assemblies, it is thus necessary to arrange the stator as well as motor electronics in suitably sealed housings, so that these components cannot come into contact with moisture.

SUMMARY OF THE INVENTION

With regard to this problem, it is an object of the invention, to improve a circulation pump assembly to the extent that a sealed arrangement of the stator and motor electronics in the motor housing is rendered possible in a simple manner.

The circulation pump assembly according to the invention comprises a wet-running electrical drive motor, which is to say a drive motor, with which the rotor driving the impeller in rotation rotates in the fluid to be delivered. For this, the rotor is separated from a stator of the drive motor by an air gap sleeve, so that the stator cannot come into contact with the fluid to be delivered. A centrifugal pump impeller delivering fluid in the inside of a pump casing, in the known manner is connected to the rotor in a rotationally fixed manner. The pump casing comprises a fluid entry and a fluid exit as well as the required channel guidance towards the impeller and away from the impeller. A motor housing is connected to the pump casing and with the circulation pump assembly according to the invention forms a combined stator and electronics housing, in which the stator of the drive motor as well as necessary motor electronics are arranged. Thus, preferably, all electrical or electronic components are arranged in the common motor housing. The motor electronics in particular can be a frequency converter for activating the drive motor, in order to permit a speed control of the drive motor.

According to the invention, the motor housing is configured such that it is closed at a first axial end by an air gap sleeve of the drive motor. This first axial end, seen in the direction of the longitudinal axis which corresponds to the rotation axis of the drive motor, is that axial end which faces the pump casing which is to say is adjacent to the pump casing. Whenever hereinafter the axial direction it is referred to, this is therefore always to be understood as the longitudinal direction in the direction of the rotation axis of the drive motor.

An air gap sleeve in the context of this invention is to be understood as arbitrarily shaped separating elements which separate the rotor space filled with fluid, from the dry stator space. The air gap sleeve can also be a can (gap tube) which is closed in a suitable manner at its end extending into the inside of the motor housing. The air gap sleeve for example can also be configured as a flat plate or disc, if the rotor and the stator do not engage into one another, but lie axially opposite one another. What is essential to the invention is merely the fact that the air gap sleeve which is to say the separating element between the rotor and the stator closes the motor housing at its end which faces the pump casing, in order to permit a filling of the motor housing with the potting mass.

The motor housing comprises an outer peripheral wall which as a whole can be essentially tubular and in the described manner is closed at the first axial end by the air gap sleeve. The air gap sleeve and the peripheral wall thus together form a pot-like or beaker-like shape, wherein the air gap sleeve departing from the first axial end can extend into the inside of the motor housing. Despite this, the air gap sleeve together with a peripheral wall of the motor housing defines an inner space which is closed to the first axial end by the air gap sleeve. The motor housing comprises an opening at the second axial end which is remote considered in the mentioned longitudinal direction, said opening being closed by a cover. Thereby, the cover represents a separate component which is configured in a manner predominantly separated from the peripheral wall of the motor housing and is applied onto the peripheral wall at a later stage, in order to close the opening at the second axial end.

The motor housing is filled with a potting mass in the inside of this and in a region which is adjacent the first axial end which is to say is adjacent to the air gap sleeve which is arranged there. Thereby, the potting mass surrounds or envelops the stator as well as the motor electronics in the inside of the motor housing. The potting mass thus represents an encapsulation of the electrical or electronic components in the inside of the motor housing, said encapsulation sealing off the electrical or electronic components, in particular to the outside and protecting them from moisture or humidity. Further seals on the motor housing, for example between the cover and a peripheral wall of the motor housing or between the air gap sleeve and the motor housing, become superfluous on account of this. A sealing of all electrical components in the inside of the motor housing can therefore be achieved in a simple manner, wherein this sealing ensures the electrical safely. The potting mass moreover represents an additional fixation of the stator and the motor electronics in the inside of the motor housing, so that vibrations of the components arranged in the motor housing are avoided. The components are reliably fixed by the surrounding potting mass.

The cover is connected to the motor housing preferably with a non-positive, positive and/or material fit. Thereby, this is a connection which can be created at a later stage after the assembly of the stator and the motor electronics in the inside of the motor housing. In particular, detent or snap connections can be provided, and these permit the cover to be clicked or snapped on the motor housing. Alternatively or additionally however, a clamping connection and/or a material-fit connection, such as welding or bonding for example, are possible. The connection between the cover and the motor housing or a peripheral wall of the motor housing is particularly preferably configured such that this connection can no longer be released without destruction after the connection between the cover and motor housing. A permanent closure of the motor housing can therefore be realized by the cover.

According to a particular embodiment of the invention, display and/or operating elements can be arranged on or in the cover. The display elements can likewise comprise light diodes, a display or likewise. Moreover, operating elements such as switches or buttons for example can be arranged on or in the cover. These, for example, can be touch buttons or also push-buttons. It is possible to arrange an additional circuit board in the cover, for the electrical connection of the operating and/or display elements, wherein these operating and/or display elements are arranged on this additional circuit board. An electrical connection to the further motor electronics arranged in the motor housing can be realized by plug-in contacts or also at least one cable connection between the cover and the motor electronics. For this, it is possible for suitable connection contacts or also at least one connection cable to extend out of the potting mass to the cover.

Further preferably, the region which is filled with the potting mass is distanced to the second axial end of the motor housing and/or an inner side of the cover. In particular, the surface of the potting mass which faces the second axial end is distanced to the second axial end of the motor housing which is to say to the second axial end of the peripheral wall of the motor housing and/or to the inner side of the cover. Such a design permits a simpler potting, since a potting is possible in a manner such that for pouring, the motor housing is aligned such that the opening at the second axial end is situated at the top and the potting mass can be poured through the second opening into the inside of the motor housing. If it is not necessary to fill this motor housing defined by the peripheral wall, in a complete manner to up to the upper side, then this has the advantage that an exact metering of the potting mass is not necessary. In contrast, it is sufficient to pour in so much potting mass that the stator and the motor electronics are completely enveloped by the potting mass. For this, it is preferable for the stator and the motor electronics to be distanced to the second axial end and in particular to the opening at the second axial end, by an amount which is larger than the necessary enveloping thickness, with which the potting mass must envelop the electrical or electronic components. This means that the amount is selected with such a magnitude that certain fluctuations of the filling quantity of the potting mass can be tolerated.

According to a further preferred embodiment of the invention, the circulation pump assembly comprises at least one electrical connection cable. Such an electrical connection cable in particular can serve for the energy supply of the drive motor. The connection cable or an additional connection cable can also additionally serve for data communication, for example in order to connect the circulation pump assembly to an external control or, as the case may be, to external sensors. The at least one electrical connection cable is arranged such that it extends outwards out of the motor housing. For this, the motor housing preferably comprises an opening, through which the connection cable extends outwards. This opening is particularly preferably formed in the interface which is to say in the contact region, between the cover and the motor housing or between the cover and peripheral wall of the motor housing. This has the advantage that the connection cable can be inserted in a very simple manner given a removed cover, and the cover be put on, wherein the opening necessary for the connection cable remains between the cover and the motor housing. The connection cable thus does not need to be threaded through an opening into the inside of the motor housing. Thereby, preferably, no seal is necessary in the region of the opening on account of the potting mass in the inside of the motor housing.

Further preferably, the at least one electrical connection cables extends with one end into the potting mass, in a manner such that this end is embedded in the potting mass such that the potting mass is engaged with a sheath of the connection cable, as a strain relief. This means that the potting mass forms the strain relief, and preferably no further clamping means are necessary for a strain relief, by which means the assembly is further simplified. Preferably there are arranged projections or undercuts which extend in a direction transverse to the longitudinal axis of the cable. As the case may be, it is possible to fasten fixation elements, for example in a clamping manner, on the connection cable before the pouring/potting, and these fixation elements are later positively surrounded by the potting mass and therefore serve for an improved fixation of the connection cable in the potting mass. According to a further possible embodiment, it would also be possible to tie a knot in the connection cable, and this knot is also cast in with the potting mass. A positive connection between the connection cable and the potting mass can therefore also be achieved. A structuring of the sheath of the connection cable would also be possible, in order to achieve an improved engagement between the potting mass and the sheath.

Further preferably, the connection cable extends out of the potting mass, in a direction facing the second axial end, and in the further course extends out of the motor housing to the outside, transversely to this direction. Such a design has the advantage that no radially outwardly directed opening needs to be formed in the motor housing or peripheral wall, in the region which is filled with the potting mass, through which opening the potting mass could run outwards on being filled. The connection cable in contrast preferably extends outwards out of a surface of the potting mass which is situated at the top on pouring. The deflection of the connection cable which is then subsequent outside the potting mass, such that it extends out of the motor housing transversely to the longitudinal direction of the circulation pump assembly, has the advantage that the face side of the motor housing which is formed by the cover cannot be penetrated by the connection cable. Thus, no special opening needs to be provided in this region and the connection cable can preferably be led outwards between the motor housing and the cover, in the previously described manner, by which means the assembly is simplified. The deflection of the cable between the exit out of the potting mass and the exit out of the motor housing is effected in a free space in the inside of the motor casing, said free space not being filled with potting mass.

According to a further preferred embodiment of the invention, the motor housing is formed from at least two housing parts, wherein a first housing part is connected to the pump casing, and a second housing part is connected non-positively, positively and/or materially to the first housing part, wherein the first and the second housing part together delimit the interior with the region filled with the potting mass. The first housing part is preferably connected at the first axial end to the air gap sleeve. The second housing part is further preferably configured in a tubular manner and is connected to the first housing part at the open end of this which is away from the first axial end. Particularly preferably, the first and second housing part can be stuck into one another in this region, so that their peripheral walls overlap one another. Thus, on the one hand a sealed connection preventing the potting mass from flowing out can be formed, and one the other hand a non-positive or clamping fixation of the first housing part on the second housing part can be achieved. Particularly preferably, the second housing part overlaps the first housing part at its outer periphery. This means that the first housing part at its axial end facing the pump casing has an inner cross section which corresponds to the outer cross section of the first housing part, at the axial end of this first housing part which is away from the pump casing.

The two-part design of the motor housing has the advantage that the stator and the air gap sleeve, which is to say the most essential components of the drive motor can be fixed in the first housing part. This first housing part can be configured as a standard part, whereas the second housing part can then be easily adapted to different customer-specific specifications. The second housing part can thus be varied slightly with regard to its fashioning, and moreover in particular also be adapted in its size and/or shape to the electronics to be accommodated. Different electronic components can be arranged in the second housing part, and/or operating elements can be formed or arranged on the second housing part and/or on the cover, depending on the functionality which the circulation pump assembly is to have.

The first and the second housing part, adjacently to the interior, are particularly preferably shaped such that the potting mass effects a positive fit between the first and the second housing part. For this, the first and/or the second housing part can comprise projections and/or shoulders which face the interior and which are enclosed by the potting mass such that undercuts embraced by the potting mass are formed in the axial direction. The potting mass can prevent the first and the second housing part from being pulled apart again in the axial direction, in which they were previously joined together. Such a positive connection can be present additionally to a non-positive connection between the two housing parts.

According to a further preferred embodiment, the first housing part is fixed on the pump casing by way of a union nut, wherein the union nut engages over a projection on the first housing part and is releasably engaged with a thread on the pump casing. The union nut can thereby rotate relative to the first housing part, in order to be screwed onto the thread of the pump casing and to be unscrewed from this again. Such a union nut permits a connection between the motor housing and the pump casing, said connection being easy to release, so that the motor housing can be easily removed from the pump casing for maintenance and repair purposes. The union nut preferably has a radially inwardly directed collar which has an inner diameter which is smaller than the outer diameter of the radially outwardly directed collar on the first housing part. The union nut therefore comes to bear on the projection in the axial direction and can exert an axial force upon the projection, so as to press the first housing part of the motor housing and thus the complete motor housing against the pump casing. The rotation axis of the union nut preferably corresponds to the rotation axis of the drive motor or extends parallel to this.

Further preferably, the second housing part is arranged on the first housing part such that the second housing part secures the union nut on the first housing part in the axial direction. This is effected for example in a manner such that the second housing part engages over the first housing part on the outer periphery of this first housing part, so that the face edge of the second housing part which faces the pump casing lies opposite an axial face side of the union nut in a manner such that the union nut comes to bear on this face edge when this union nut is moved in the axial direction to the second housing part. The assembly is thereby effected in a manner such that the union nut is put onto the first housing part, before the second housing part is connected to the first housing part. The union nut is captively secured on the motor housing in this manner.

According to a further preferred embodiment, the air gap sleeve is configured as one piece with the motor housing, in particular from plastic. If the motor housing is formed from two housing parts, then the air gap sleeve is thus preferably manufactured as one piece with the first housing part. The single-piece manufacture of the air gap sleeve and the motor housing, which is to say of the first housing part of the motor housing, has the advantage that no assembly of the air gap sleeve and the motor housing is necessary. The motor housing at the first axial end therefore is moreover sealingly closed in a direct manner, in order to form the pot-like or beaker-like shape for receiving the potting mass, said shape having been described above. Additional sealing is not necessary in this region.

According to a particular embodiment of the invention, the drive motor is a spherical motor with a spherical-cap-shaped air gap sleeve. As described above, such a spherical motor is characterized in that the rotor with the impeller is mounted on a central mounting ball which apart from the rotation movement about the longitudinal or rotation axis also permits a slight pendulating movement on the ball surface transversely to this rotation axis. The rotor for this preferably has a hemispherical shape and the spherical-cap shaped air gap sleeve has a curvature concentric to the outer contour of the rotor about the central mounting ball. The rotor preferably forms a construction unit with the impeller. The rotor with the impeller thus rotates in a rotor space which is formed between the motor housing and the pump casing. The rotor and the impeller can be easily removed when the motor housing is separated from the pump casing, for example for cleaning or maintenance purposes.

The stator is preferably fixed on the air gap sleeve. This means that the stator is preferably not fixed on the inner wall of the motor housing, which is to say on the inner side of the peripheral wall of the motor housing. In contrast, a free space can remain preferably between the outer periphery of the stator and the inner periphery of the peripheral wall of the motor housing, and this free space is filled by the potting mass. The fixation of the stator on the air gap sleeve has the advantage that the stator is already fixed in a defined position before the filling of the potting mass into the motor housing, so that the fixation is not effected solely by the potting mass. The potting mass however can represent an additional fixation which in particular can prevent vibrations. The stator is particularly preferably fixed on the air gap sleeve by detent means. The detent means as detent tongues can preferably be configured as one piece with the air gap sleeve, so that the stator can be clicked or snapped onto the air gap sleeve in a simple manner from the inner side of the motor housing. The detent means thereby ensure that the stator is pressed against the outer side of the air gap sleeve, so that the stator is positioned as close as possible to the rotor space, in order to improve the magnetic efficiency of the drive motor.

According to a further preferred embodiment of the invention, the motor housing widens in cross section towards the second axial end. This means that the motor housing has an essentially conical shape. This permits a particularly large opening at the second axial end and this simplifies the filling of the potting mass.

The opening at the second end preferably extends essentially over the entire cross section of the motor housing. As described above, the motor housing preferably has a peripheral wall whose face edge at the second axial end defines or surrounds the opening. The opening thus preferably corresponds to the inner cross section of the peripheral wall at the second axial end.

As described, the potting mass is preferably filled into the interior or inner space through the opening. A particularly large opening is therefore advantageous, in order to permit a simple filling of the potting mass.

With regard to the potting mass, it is preferably the case of a plastic material, in particular an electro-casting resin. Such an electro-casting resin can be a two-component resin for example, in particular based on polyurethane. However, other suitable potting masses and/or casting resins can be applied. Thereby, one can apply e.g. potting masses which cure chemically or physically, for example thermally.

Apart from the circulation pump assembly according to the invention, the subject matter of the invention is a method for manufacturing a circulation pump assembly, in particular for manufacturing a circulation pump assembly according to the preceding description. Such a circulation pump assembly comprises a pump casing and a motor housing which is connected to this, wherein the motor housing forms an integrated stator and electronics housing which receives the stator and the motor electronics of the drive motor of the circulation pump assembly. The method according to the invention relates to the manufacture or assembly of the motor housing. The motor housing is firstly provided for this, and this housing is closed at a first axial end by an air gap sleeve and comprises an opening at the opposed, second axial end. This motor housing thus preferably has an essentially tubular peripheral wall which is configured closed at the first axial end by the air gap sleeve and is open at the second axial end which is to say has the described opening. The air gap sleeve can thereby indeed extend by a certain amount into the inside of the motor housing, which is to say into the region defined by the peripheral wall. However, an inner space of the motor housing remains and this interior is delimited by the peripheral wall and is closed to the first axial end by the air gap sleeve. The stator and the motor electronics are inserted through the described opening into such a motor housing and fixed in a suitable manner, for example in the manner described above. Suitable fastening elements can be present for this, in the inside of the motor housing and/or on the air gap sleeve.

After the fixation of the stator and motor electronics in the inside of the motor housing, this motor housing is filled with a potting mass, at least in the region, in which the stator and the motor electronics are arranged. The filling of the potting mass is effected through the opening without any pressure. For this, the motor housing is aligned such that its opening is directed to the top, and the motor housing thus forms a pot or beaker with the air gap sleeve as the base. The potting mass can thus be simply poured from above into the inside of the motor housing, until this is adequately filled with potting mass, so that the stator and the motor electronics are completely covered by the potting mass. The opening is subsequently closed by a cover, wherein the cover for example can be locked on the motor housing in the manner described above. A connection cable which is connected to the motor electronics is particularly preferably led outwards between the cover and the motor housing, wherein the connection cable or its end which is adjacent the motor electronics is co-embedded into the potting mass.

The above description of the circulation pump assembly is referred to with regard to further preferred details of the method, from which description preferred method features can likewise be directly or indirectly deduced, and these method features define preferred embodiments of the method according to the invention.

The invention is hereinafter described by way of example and by way of the attached FIGURE. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

The only FIGURE is a sectioned view of a circulation pump assembly according to the invention.

DESCRIPTION OF THE PREFERRED EMBODIMENTS

Referring to the drawings, the shown circulation pump assembly consists essentially of two parts, specifically of a pump 2 as well as of an electric drive motor 4. The pump 2 comprises a pump casing 6 which is preferably configured as a cast part of metal. The pump casing 6 in the described manner has an entry 10 and an exit 12. The pump casing 6 in its inside moreover in the known manner comprises the necessary flow paths to an impeller 8 and away from the impeller 8 to the exit 12. The impeller 8 rotates in a rotor space which is formed between the pump casing 6 and the air gap sleeve described below. The impeller 8 is fixedly connected to a rotor 14 of the drive motor 4. The rotor 14 is preferably a permanent magnet rotor.

The electric drive motor 4 is configured as a wet-running electric motor and comprises an air gap sleeve which is configured as a separating spherical cap 16 and which separates the rotor space, in which the rotor 14 with the impeller 8 is arranged, in a fluid-tight manner from a stator space, in which the stator 18 of the electric drive motor is situated. The motor which is shown here is configured as a spherical motor. This means that the air gap sleeve 16 has a spherical-cap-shaped design and the rotor 14 is rotatably mounted on a ball 20 in a central manner. The separating spherical cap 16 has a curvature which is concentric to the ball 20. The rotor 14 is shaped in a corresponding manner at its outer periphery, so that it can rotate about the longitudinal axis X in the inside of the separating spherical cap 16 and can pivot by a certain amount transversely to the longitudinal axis X. However, it is to be understood that the subsequently described principle of the design of the electric drive motor and which is according to the invention can also be applied to other motors.

The electric drive motor 4 comprises a motor housing 22 which in this case is configured of two housing parts 22a and 22b. The motor housing 22 represents a combined stator and electronics housing which apart from the stator 18 accommodates the required motor electronics which are here represented in the form of the circuit board 34. The motor housing 22 comprises a first axial end 24, at which it is connected to the pump casing 6. The motor casing 22 is closed by a cover 28 at the second axial end 26 which is opposite in the direction of the longitudinal axis X. The longitudinal or rotation axis X is thereby the longitudinal axis of the pump assembly which corresponds to the rotation axis of the rotor 14 and of the impeller 8.

The first housing part 22a which is connected to the pump casing 6 is configured as one piece with the separating calotte 16, so that the separating calotte 16 closes the interior of the housing part 22a to the first axial end 24. Thus, an as a whole pot-like and beaker-like motor housing is created by the tubular and annular peripheral wall of the motor housing 22 respectively, and by the separating calotte 16 forming the base. The first housing part 22a of the motor housing 22 has an annular projection 30 at the outer periphery, and a union nut 32 which is screwed to the pump casing 6 engages over this projection. A releasable connection of the electrical drive motor 4 or of the motor housing 22 to the pump 2 or to the pump casing 6 is therefore created. The first housing part 22a is peripherally embraced by the second housing part 22b, wherein the second housing part 22b is pressed or pushed with its inner periphery onto the outer periphery of the first housing part 22a. The union nut 32 is put onto the first housing part 22a before putting on the second housing part 22b. The second housing part 22b thus engages over, which is to say embraces the union nut 32, such that this is captively secured on the first housing part 22. The housing parts 22a and 22b of the motor housing 22 together enclose an interior, in which the stator 18 as well as a circuit board 34 with the motor electronics is arranged. The circuit board 34 contacts the stator coils of the stator 18 and carries electric or electronic components for the control of the drive motor. An electrical connection cable 36 which is led outwards through an opening 38 out of the motor housing 22 is moreover connected to the circuit board 34. The opening 38 lies between the motor casing 22 and the cover 28, so that the connection cable 36 can be introduced into the motor housing 22 before closing the cover 28.

According to the invention, the inside which is to say the interior of the motor housing 22 is filled out with a potting mass 40 which is represented in a hatched manner in the drawing. The potting mass 40 thereby fills a region in the inside of the motor housing 22 and which is adjacent to the first axial end 24, in a manner such that the complete stator 18 as well as the circuit board 34 with the electrical or electronic components are completely enveloped by the potting mass 40. The potting mass 40 before the closure of the cover 28 is filled through an opening 42 at the first axial end 26, into the stator housing 22. The opening 42 extends over the entire face side, which is to say over the entire cross section of the motor casing 22, at its second axial end 26. The opening 42 is defined which is to say delimited by the axial face edge of the peripheral wall of the housing part 22b. This means that the housing part 22b and with this, the motor housing 22 are completely open to the top in the absence of the cover 28, in the case of a vertical alignment as is shown in the FIGURE. The motor housing 22, departing from the first axial end 24, in cross section with respect to the longitudinal axis X widens to the second axial end 26. This permits a very large opening 42, through which the potting mass 40 can be filled in. The potting mass 40 does not fill the inside of the motor housing 22 up to the edge of the opening 42 which is to say up to the second axial end 26. This has advantages concerning manufacturing technology, since as such the quantity potting mass 40 does not have to be metered which is to say dosed, in an exact manner. In contrast, given a vertical alignment of the longitudinal axis X, the potting mass can be simply poured into the opening 42 which is thereby situated at the top, until the interior of the motor housing 22 is largely filled, without the potting mass running over the upper edge of the opening 42. A shrinking of the potting mass on solidification is also not a problem. What is essential is merely the fact that all electric or electronic components are completely covered by the potting mass 40. A resin or artificial resin material, for example epoxy resin is applied as a potting mass 40. The potting mass in particular can be an electro-casting resin based in two components, for example based on polyurethane.

The potting mass 40 moreover fixes the connection cable 36 in the inside of the motor housing 22, so that the potting mass 40 functions as a strain relief and an additional strain relief becomes superfluous. The potting mass 40 thus envelops the insulation or encasing of the connection cable 36 over a certain length, so that a non-positive and/or material connection between the potting mass 40 and the outer side of the connection leads 36 is created. The connection leads 36 could additionally yet also be provided with a knot or other undercuts on the outer periphery, and these are embraced by the potting mass 40, so that a positive connection can be achieved between the potting mass 40 and the connection cable 36.

The potting mass 40 thereby yet additionally secures the connection between the two housing parts 22a and 22b of the motor housing 22. The housing part 22b of the motor housing 22 at its end engaging over the first housing part 22a comprises an inwardly directed, peripheral projection 44 which comes to bear on the outer periphery of the first housing part 22a. Since the complete inner space in this region of the motor housing 22 is filled with the potting mass 40, the potting mass 40 thereby engages over the face edge of the projection 44 which faces the second axial end 26, so that the second housing part 22b can no longer be pulled from the first housing part 22a in the axial direction X. Thus, a connection between the housing parts 22a and 22b is therefore created by way of the potting mass 40, wherein this connection can no longer be released without destruction.

A display element 56 in the form of a light diode as well as operating element 58 in the form of a button is arranged in the cover 28 in this embodiment example. The operating and display elements 56, 58 are arranged on a circuit board 60 which is situated on the inner side of the cover 28 and which is connected via a cable connection in the form of the connection cable 62, to the electronics on the circuit board 34. The connection cable 62 is electrically conductively connected to the circuit board 34, and the potting mass 40 is likewise poured in. In this example, the connection cable 62 is electrically conductively connected to the circuit board 60 via a plug-in connection 64. The plug-in connection 64 renders it possible to firstly insert the connection cable 60 with the circuit board 34 into the potting mass 40 and to connect the connection cable 62 to the circuit board 60 not until after the pouring-in before the assembly of the cover 28. The connection cable 62 is configured sufficiently long for this, wherein the excess length of the connection cable 62 then remains in the free space between the potting mass 40 and the cover 28. It is to be understood that the invention could however also be realized without these operating and display elements 56, 58. Moreover, fixedly arranged plug-in contacts could also be arranged in the motor housing 22 instead of the connection cable 62, and these come into electrically conductive engagement with the circuit board 60 when putting on the cover 28.

The connection of the cover 28 to the motor housing 22 which is to say its second part 22b is likewise configured such that it cannot be practically released without destruction. This is realized by one or more detent tongues 46 and 48 which are situated in the inside. The at least one detent tongue 46 is thereby formed as one piece with the cover 28, and extends in the inside of the cover 28, departing from the cover into the inside of the part 22b of the housing 22. There, a detent projection 50 positively engages with a recess in the detent tongue 46. The at least one detent tongue 48 is configured as one piece with the housing part 22b of the housing 22 and, departing from the motor housing 22 extends to the cover 26 into the inside of this, and there engages with a detent projection 52 in a corresponding manner. The detent tongues 46 and 48 can no longer be reached from the outside and thus cannot be disengaged from the detent projections 50, 52 due to the fact that the detent connections between the detent tongues 46, 48 and the detent projections 50, 52 are thus situated in the inside of the space enclosed by the motor housing 22 and the cover 28, after the fixation of the cover 28 on the motor housing 22. A connection between the motor housing 22 and the cover 28 which although being able to be easily created by way of clicking or snapping, however cannot later be released, is thus created.

The assembly of the drive motor 4, as has been described beforehand, is effected in a manner such that the union nut 32 is firstly put onto the housing part 22a. The second housing part 22b is subsequently pushed onto the first housing part 22a in a clamping manner, by which means the union nut 32 is fixed on the motor housing 22 in the axial direction X. The stator 18 is subsequently inserted through the opening 42 into the motor housing 22 and fixed by detent on the outer periphery of the separating spherical cap 16. For this, detent hooks 54 (only one is to be seen in the FIGURE) engage into corresponding recesses on the stator 18, so that the stator 18 is positively fixed in the separating spherical cap 16. Thereby, the stator 18 is distanced to the inner periphery of the peripheral wall of the housing part 22, which means it is not clamped on the inner periphery of the motor housing 22. The circuit board 34 with the motor electronics and to which the connection cable 36 is already connected is preferably connected beforehand to the stator 18. Thus, the stator 18 and the circuit board 34 which is fastened on this and with the connection cable 36 is already fixed in the inside of the motor housing 22 by way of the detent connection on the separating spherical cap 16. The motor housing 22 is subsequently aligned vertically with its longitudinal axis X, and the potting mass 40 is poured in from the top, until the circuit board 34 is adequately covered and thus the lower part of the motor housing 22 is filled in its inside with the potting mass 40. The connection cable 36 thereby extends upwards, which is to say in a direction essentially parallel to the longitudinal axis X, out of the potting mass 40 and not until in the free space between the surface of the potting mass 40 and the cover 28 which is to be put on subsequently is this cable deflected in the transverse direction. The cover 28 is placed upon the motor housing 22 in the manner described above, after the filling of the potting mass 40, wherein the connection cable 36 is led outwards through the opening 38 which is formed between the motor housing 22 and the cover 28. The assembly is very simple since a very simple pressure-free pouring of the potting mass 40 due to gravity is effected. Moreover, no additional seals are necessary between the cover 28 and the motor housing 22.

While specific embodiments of the invention have been shown and described in detail to illustrate the application of the principles of the invention, it will be understood that the invention may be embodied otherwise without departing from such principles.

APPENDIX

| List of reference designations | |
|---|---|
| 2 | pump |
| 4 | electric drive motor |
| 6 | pump casing |
| 8 | impeller |
| 10 | entry |
| 12 | exit |
| 14 | rotor |
| 16 | separating spherical cap |
| 18 | stator |
| 20 | ball |
| 22 | motor housing |
| 22a, 22b | parts of the motor housing |
| 24 | first axial end |
| 26 | second axial end |
| 28 | cover |
| 30 | projection |
| 32 | union nut |
| 34 | circuit board |
| 36 | connection cable |
| 38 | opening |
| 40 | potting mass |
| 42 | opening |
| 44 | projection |
| 46, 48 | detent tongues |
| 50, 52 | detent projections |
| 54 | detent hooks |
| 56 | display element |
| 58 | operating element |
| 60 | circuit board |
| 62 | connection cable |
| 64 | plug-in connection |
| X | longitudinal or rotation axis |

What is claimed is:

1. A circulation pump assembly comprising: a wet-running, electrical drive motor with a stator; a plurality of motor electronics; a pump casing; a cover; a potting mass; a motor housing connected to the pump casing, wherein the motor housing is a combined stator and electronics housing accommodating the stator of the drive motor as well accommodating the motor electronics, the motor housing having a first axial end, which faces the pump casing, that is closed by an air gap sleeve of the drive motor and the motor housing having a second axial end which is away from the pump casing and comprises an opening closed by the cover and the motor housing having an interior in a region adjacent the first axial end that is filled with the potting mass which surrounds the stator and the motor electronics; and at least one electrical connection cable which extends outwards out of the motor housing, wherein one end portion of the at least one electrical connection cable is embedded in the potting mass such that the potting mass is engaged with sheathing of the at least one electrical connection cable to form a strain relief device, and the at least one electrical connection cable is led out of the potting mass in a direction towards the second axial end and extends outwards out of the motor housing transversely to the direction towards the second axial end, wherein a portion of the at least one electrical connection cable extends from a position adjacent to at least one component of the motor electronics to a position located in an interior of the motor housing without any intervening electrical connections, the portion of the at least one electrical connection cable being in direct contact with the potting mass and surrounded by the potting mass; the potting mass being a one-piece potting mass.

2. A circulation pump assembly according to claim 1, wherein the cover is non-positively, positively and/or materially connected to the motor housing.

3. A circulation pump assembly according to claim 1, further comprising display or operating elements or display and operating elements arranged on the cover.

4. A circulation pump assembly according to claim 1, wherein the region of the interior filled with the potting mass is distanced to the second axial end of the motor housing or distanced to an inner side of the cover or distanced to the second axial end of the motor housing and distanced to an inner side of the cover, wherein the at least one electrical connection cable extends through a cable receiving opening in the motor housing, the cable receiving opening being located at a spaced location from the potting mass.

5. A circulation pump assembly according to claim 1, wherein the motor housing comprises at least two housing parts, wherein a first housing part is connected to the pump casing, a second housing part is non-positively, positively and/or materially connected to the first housing part, and the first and the second housing part together delimit the interior with the region filled with the potting mass, the motor housing comprising a space free of the potting mass, the at least one electrical connection cable comprising an electrical connection cable extent arranged in the space free of the potting mass, wherein the electrical connection cable extent is located at a spaced location from the potting mass.

6. A circulation pump assembly according to claim 5, wherein the first housing part and the second housing part are shaped, in a region adjacent to the interior, such that the potting mass effects a positive fit between the first and the second housing part, wherein a portion of the motor housing defines at least a portion of a cable receiving opening, the portion of the motor housing being located at a spaced location from the potting mass, the at least one electrical connection cable extending through the cable receiving opening.

7. A circulation pump assembly according to claim 5, further comprising a union nut, wherein the first housing part is fixed on the pump casing by the union nut and the union nut engages over a projection on the first housing part and is secured on the first housing part in the axial direction by the second housing part, the motor electronics comprising a circuit board, the circuit board comprising a lateral circuit board surface, wherein a portion of the potting mass is arranged between the lateral circuit board surface and a portion of the motor housing, the at least one electrical connection cable being connected directly to the circuit board.

8. A circulation pump assembly according to claim 1, wherein the air gap sleeve is configured as one piece with the motor housing and is formed of plastic.

9. A circulation pump assembly according to claim 1, wherein the drive motor is a spherical motor with a spherical-cap-shaped air gap sleeve.

10. A circulation pump assembly according to claim 1, wherein the stator is fixed on the air gap sleeve and is held on the air gap sleeve by a detent device.

11. A circulation pump assembly according to claim 1, wherein the motor housing widens in cross section to the second axial end.

12. A circulation pump assembly according to claim 1, wherein the opening at the second axial end extends essentially over an entire cross section of the motor housing.

13. A circulation pump assembly according to claim 1, wherein the potting mass is filled through the opening, into the interior, wherein a portion of the potting mass is located radially between the stator and the motor housing with respect to a longitudinal axis of the stator.

14. A circulation pump assembly according to claim 1, wherein the potting mass is a plastic material.

15. A method for manufacturing a circulation pump assembly comprising a wet-running, electrical drive motor with a stator, a plurality of motor electronics, a pump casing, a cover, a potting mass and a motor housing connected to the pump casing, the method comprising the steps of: providing the motor housing such that the motor housing is closed at a first axial end by an air gap sleeve and such that the motor housing comprises an opening at an opposite, second axial end; inserting the stator and the motor electronics through the opening into the motor housing; pressure-free pouring of the potting mass through the opening into the motor housing; closing the opening by the cover after pressure-free pouring of the potting mass through the opening in the motor housing, whereby the motor housing forms a combined stator and electronics housing accommodating the stator of the drive motor as well accommodating the motor electronics, wherein the circulation pump assembly further comprises at least one electrical connection cable which extends outwards out of the motor housing, wherein one end portion of the at least one electrical connection cable is embedded in the potting mass such that the potting mass is engaged with sheathing of the at least one electrical connection cable to form a strain relief device, and the at least one electrical connection cable is led out of the potting mass in a direction towards the second axial end and extends outwards out of the motor housing transversely to the direction towards the second axial end, wherein a portion of the at least one electrical connection cable extends from a position adjacent to at least one component of the motor electronics to a position located in an interior of the motor housing without any intervening electrical connections, the portion of the at least one electrical connection cable being in direct contact with the potting mass and surrounded by the potting mass; the potting mass being a one-piece potting mass, the one-piece potting mass surrounding the stator, the portion of the at least one electrical connection cable and the motor electronics, the cable being embedded into the potting mass such that the cable forms at least a portion of the strain relief device.

16. A method according to claim 15, wherein the region of the interior filled with the potting mass is distanced to the second axial end of the motor housing or distanced to an inner side of the cover or distanced to the second axial end of the motor housing and distanced to an inner side of the cover, the motor housing having a cable opening, wherein the at least one electrical connection cable extends through the cable opening in the motor housing, the cable opening being located at a spaced location from the potting mass.

17. A method according to claim 15, further comprising providing display elements or operating elements or display elements and operating elements on the cover.

18. A method according to claim 15, wherein the motor housing comprises at least two housing parts, wherein a first housing part is connected to the pump casing, a second housing part is non-positively, positively and/or materially connected to the first housing part, and the first and the second housing part together delimit the interior with the region filled with the potting mass, the motor housing comprising a space free of the potting mass, the at least one electrical connection cable comprising an electrical connection cable extent arranged in the space free of the potting mass, wherein the electrical connection cable extent is located at a spaced location from the potting mass, wherein a portion of the stator is located radially opposite a portion of the potting mass with respect to a longitudinal axis of the stator.

19. A circulation pump assembly comprising:
a wet-running, electrical drive motor with a stator;
motor electronics;
a pump casing; a cover;
a potting mass;
a motor housing connected to the pump casing, wherein the motor housing is a combined stator and electronics housing accommodating the stator of the drive motor as well as accommodating the motor electronics, the motor housing having a first axial end, which faces the pump casing, that is closed by an air gap sleeve of the drive motor and the motor housing having a second axial end which is away from the pump casing and comprises an opening closed by the cover and the motor housing having an interior in a region adjacent the first axial end that is filled with the potting mass which surrounds the stator and the motor electronics, the motor housing having a motor housing interior space, the motor housing interior space being free of the potting mass, wherein at least a portion of the motor housing defines at least a portion of a cable receiving opening; and
an electrical connection cable extending from a position in the potting mass through the motor housing space and the cable receiving opening to a position located outside of the motor housing, wherein a first extent of the electrical connection cable is in contact with the potting mass and a second extent of the electrical connection cable is located in the motor housing interior space at a spaced location from the potting mass, the first extent of the electrical connection cable extending continuously and without intervening separable electrical connections from a first position located adjacent to at least one of the motor electronics to a second position in the potting mass located at a spaced location from the first position; wherein the potting mass is formed in one-piece to define a one-piece potting mass structure.

* * * * *